US006450326B1

(12) United States Patent
Hoffmann et al.

(10) Patent No.: US 6,450,326 B1
(45) Date of Patent: Sep. 17, 2002

(54) ENCLOSED TRACK CONVEYOR CHAIN ASSEMBLY

(76) Inventors: Frank F. Hoffmann, 2501 Clinton Ave., St. Clair, MI (US) 48079; Arnold R. Hoffmann, 274 Longford, Rochester, MI (US) 48309; Richard W. Hoffmann, 1865 Bird Rd., Ortonville, MI (US) 48462; William E. F. Thurber, Jr., 275 Oxford Dr., Cotuit, MA (US) 02635; Richard Somerville, 334 Keene St., Duxbury, MA (US) 02332

( * ) Notice: Subject to any disclaimer, the term of this patent is extended or adjusted under 35 U.S.C. 154(b) by 0 days.

(21) Appl. No.: 09/819,510

(22) Filed: Mar. 28, 2001

Related U.S. Application Data

(60) Provisional application No. 60/193,029, filed on Mar. 29, 2000.

(51) Int. Cl.[7] ............................................. B65G 39/20
(52) U.S. Cl. ..................................... 198/845; 104/172.5
(58) Field of Search ............................... 198/685, 838, 198/845; 104/172.1, 172.4, 172.5; 59/4, 85, 86, 90, 93, 95, 900; 474/207, 210

(56) References Cited

U.S. PATENT DOCUMENTS 2,463,970 A * 3/1949 Hunnicutt .................... 474/210
3,496,784 A * 2/1970 Freeman ...................... 198/838
4,793,473 A * 12/1988 Gilgore et al. .............. 198/845
4,858,752 A * 8/1989 Ballard ........................ 198/845
4,947,758 A * 8/1990 Kuchta ...................... 104/172.5

* cited by examiner

Primary Examiner—Joseph E. Valenza
(74) Attorney, Agent, or Firm—Warn, Burgess & Hoffman, PC (57) ABSTRACT

An enclosed track conveyor chain assembly and method of construction includes a plurality of guide link assemblies and load link assemblies connected to form a conveyor chain assembly. Each load link assembly includes a pair of side walls and forward and rearward ends defining an opening. A pair of wheel assemblies supports the load link on the horizontal surfaces of the track. A guide link member is inserted into the opening of adjacent load links. Distal ends of the guide links are connected via a fastener to thereby connect adjacent load link members to form the enclosed track chain. Each guide link member includes a plurality of flat areas on the distal ends of the arms to provide a connecting surface. A fastener is inserted through openings in the distal ends to secure the guide link members together. Preferably, the connection between guide link members is pivotal to allow pivoting action of the guide link. Further, the guide link assemblies include a wheel assembly which is adapted to contact the vertical surfaces of the track.

23 Claims, 6 Drawing Sheets

ENCLOSED TRACK CONVEYOR CHAIN ASSEMBLY

This application is based on and claims priority in U.S. Provisional Patent Application Serial No. 60/193,029 filed Mar. 29, 2000.

BACKGROUND OF THE INVENTION

1. Field of the Invention

The present invention relates to a conveyor chain assembly. More specifically, the present invention relates to a novel conveyor chain assembly particularly adapted for use in an enclosed track.

2. Description of the Prior Art

The present invention relates to a conveyor chain assembly for use in an enclosed track. Enclosed track conveyor systems and chain are well known in the art. They are available from, for example, Jervis B. Webb Company under the trademark Unibilt. Such systems are also available from Richards Wilcox Manufacturing Company under the trademark Zig-Zag.

Generally, the enclosed track conveyor system comprises a conveyor chain assembly that is enclosed in a box-like track. The track has a generally square or rectangular cross-section with an opening on the bottom. A hook, or other member depends from the chain assembly through the opening in the bottom of the track.

Conventional enclosed track chain includes a pair of opposing side links and a pair of upper and lower center links. The side links are oriented such that they are parallel with the sidewalls or vertical walls of the track. The center links are oriented such that they are parallel with the upper and lower horizontal surfaces of the track. The links are connected by a connecting pin having four connecting portions. The connecting pin allows for universal joint like motion between the center and side links.

The side links include two axles for receiving two load wheels. The load wheels include an inner and outer race having a plurality of roller bearings therebetween. The wheel assembly is secured to the axle by methods such as swaging.

A guide roller is positioned between the center links. The guide roller comprises an inner and outer race connected by a plurality of roller bearings. The guide roller assembly is bolted into position intermediate the ends of the center link.

Figures 9, 11:
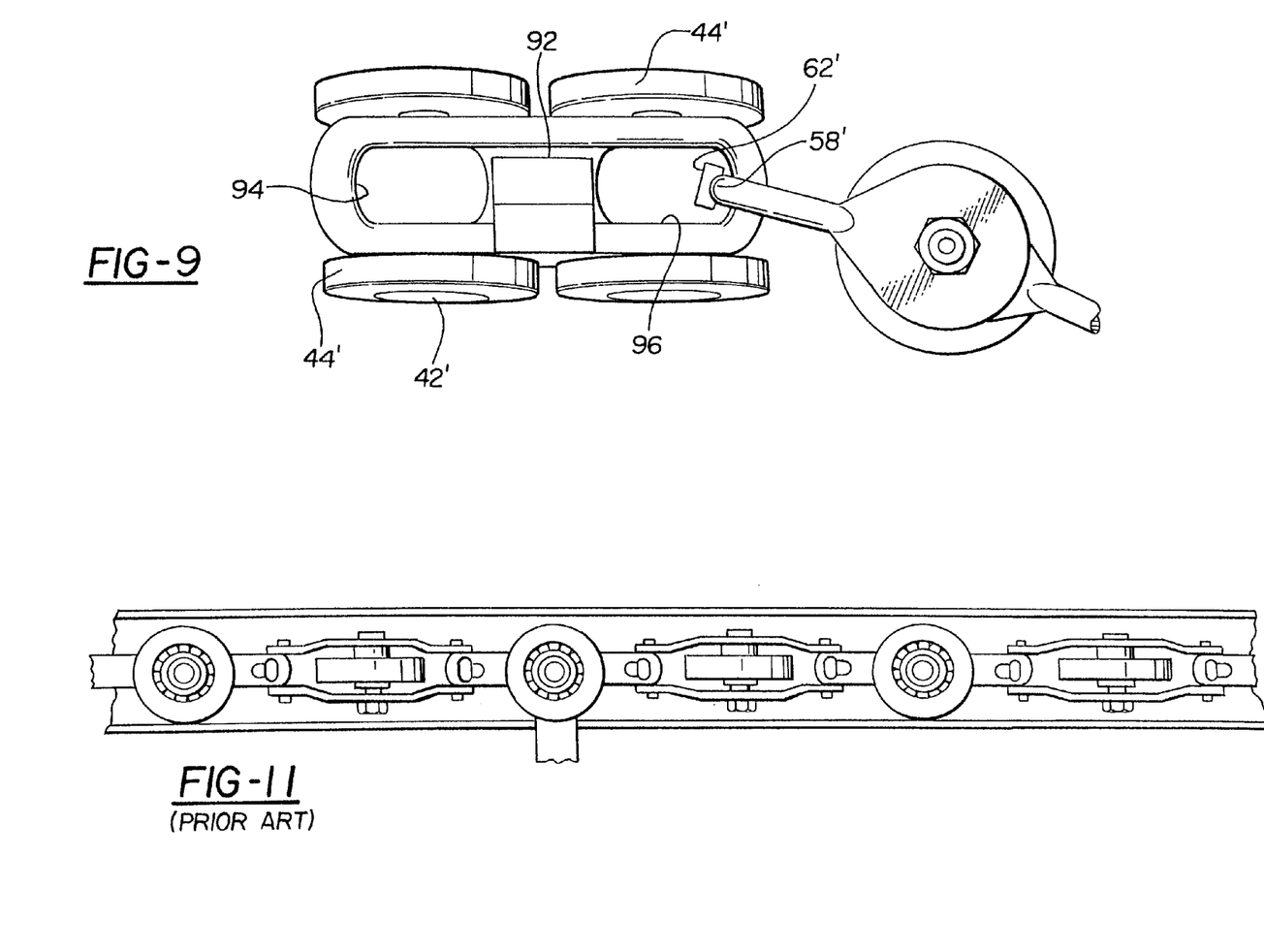
FIG. 9 is a top view of a pusher dog as shown in FIG. 6.
FIG. 11 is prior art conventional enclosed track chain assembly.

In the prior art, the center and side links comprise solid metallic components requiring a pin connection between adjacent links. Further, the inner and outer races are metallic. Such a prior art system is shown in FIG. 11.

SUMMARY OF INVENTION AND ADVANTAGES

According to the present invention, there is provided an improved enclosed track chain assembly. The assembly includes a load wheel assembly and a guide wheel assembly. The guide wheel assembly is pivotable about a point intermediate its ends.

One object of the present invention is to provide an enclosed track conveyor chain assembly that allows for a reduced turning radius.

Another object of the present invention is to provide a guide wheel assembly that is in sections and wherein each section is pivotable with respect to the other.

Another object of the present invention is to provide a conveyor chain assembly that eliminates the need to interconnect adjacent load wheel assemblies and guide wheel assemblies with connector pins.

Another advantage of one embodiment of the present invention is to provide a conveyor chain assembly having at least a non-metallic exterior surface.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figures 1, 2:
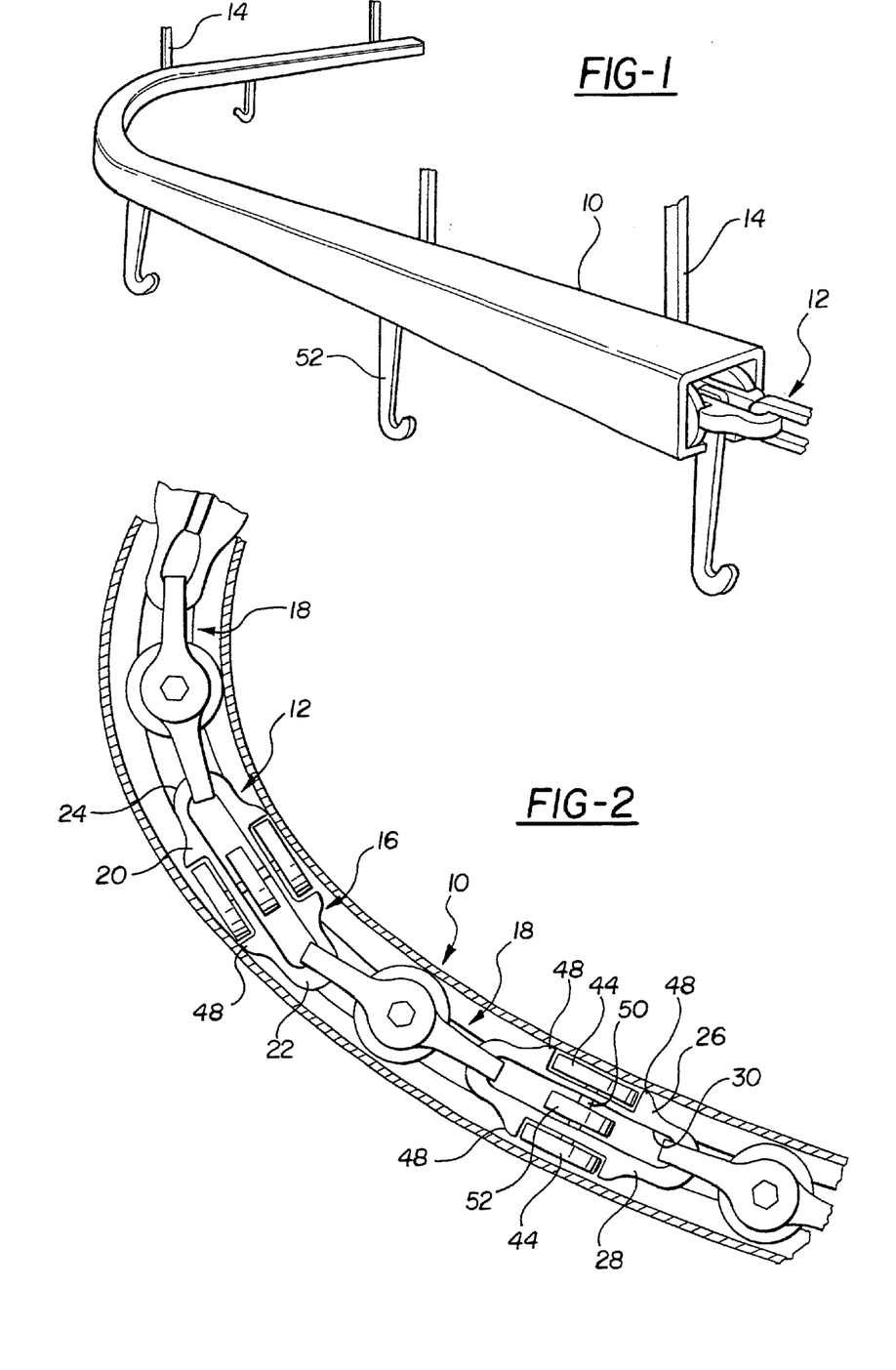
FIG. 1 is a perspective view of an enclosed track conveyor system in accordance with the present invention partially broken away.
FIG. 2 is a top plan view of a section of the conveyor system of FIG. 1 partially in cross section.

Various embodiments of the present invention are shown in the Figures. FIG. 1 generally shows an enclosed track 10, and a conveyor chain assembly 12. The enclosed track 10 is generally rectangular in cross section and has an opening extending along the bottom thereof. As shown, a plurality of supports 14 support the track 10 from a support structure, such as ceiling joists. While a conventional overhead enclosed track system is shown in the Figures, it will be appreciated that the system used may be an inverted system that is supported from the bottom and having the opening on the top surface.

The conveyor chain assembly 12 includes alternating load link assemblies 16 and guide link assemblies 18. The load link assemblies 16 are adapted to contact the horizontal surface of the track 10. These load link assemblies normally carry the downward load applied to the chain assembly 12. The guide link assemblies 18 are adapted to contact the vertical surfaces of the track 10. These guide link assemblies 18 normally carry the side loads applied to the chain assembly 12. The guide link assemblies 18 are particularly beneficial to guide the chain assembly 12 around corners or curves in the track 10. It will be appreciated that the track 10 may slope and curve and on occasion, the guide link assembly may carry the downward loads applied to the chain assembly 12. Similarly, the load link assemblies 16 may carry the side loads applied to the chain assembly 12.

Figure 3:
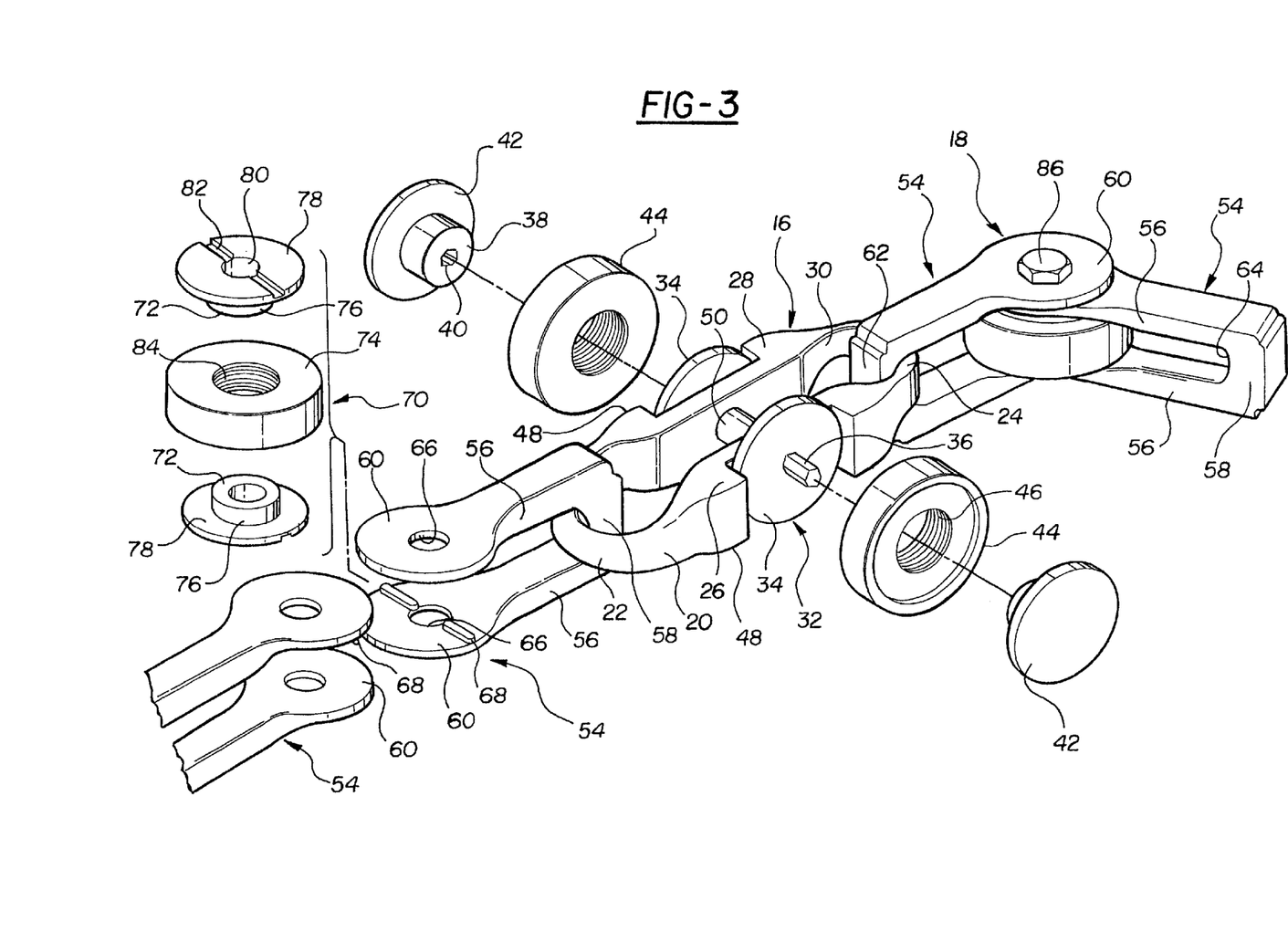
FIG. 3 is a partially exploded view of conveyor chain made in accordance with the present invention.

FIG. 3 shows an exploded perspective view of the chain assembly 12 of the present invention. The load link assembly 16 includes a load link member generally indicated at 20.

The load link member 20 is an elongated loop. The load link member 20 extends between forward 22 and rearward 24 arcuate ends. The load link member 20 further includes a pair of opposing side walls 26, 28. The side walls 26, 28 are spaced from one another and interconnect respective sides of the forward and rearward ends 22,24.

The side walls 26, 28 and forward and rearward ends 22, 24 are each preferably formed as a single unit and define an opening 30 therebetween. As shown in FIG. 3, the opening 30 has generally a dumbbell shape. More specifically, each end of the opening 30 has a generally circular shape adjacent the forward 22 and rearward 24 ends of the load link assembly 16. The opening 30 is generally rectangular in shape in the area adjacent the side walls 26, 28.

The ends of the opening 30 have a circular or arcuate configuration so as to accept the guide link assembly 18 as will be described further below. The arcuate configuration allows for pivoting movement between he guide link assembly 18 and the load link member 20.

Alternatively, and as best shown in FIG. 2, the opening 30 may have a constant width. That is, the opening is substantially rectangular. In this embodiment, the ends of the opening 30 remain arcuate.

The load link assembly 16 further includes a pair of wheel supports generally indicated at 32. The wheel supports 32 are located on the sidewalls 26,28. Each wheel support includes an inner hub 34 and a support shaft 36 extending outwardly therefrom. The diameter of the hub 34 may vary. In the preferred embodiment, the support shaft 36 has a hexagonal shape. Further, it is preferred that the wheel supports are formed integrally on the load link member 20.

The wheel supports 32 are adapted to support an inner race 38. The inner race 38 includes an opening 40 having the same configuration as the support shaft 36. As shown, the opening 40 is hexagonal. Again, the diameter of the opening 40 may vary. By using a support shaft 36 and opening 40 of like mating configuration, the inner race 38 can be supported on the shaft 36 in such a manner to prevent relative rotation between the inner race 38 and wheel support 32.

It is preferable that the shaft 36 not have a circular cross-section. A keyed shaft 36 and mating opening 40 prevent relative rotation between the shaft 36 and the inner race 38.

The inner race 38 has a generally circular cross section. The inner race 38 is elongated to form a generally cylindrical structure. The outer surface of the inner race is adapted to receive an outer race 44. The inner race 38 further has an outer hub member 42 integrally formed therewith. The outer hub member 42 is preferably circular and has a diameter greater than the diameter of the inner race 38.

The outer race 44 or wheel is disposed over the inner race 38 and rotates relative thereto. Specifically the outer race 44 rotates about the fixed inner race 38. The outer race 44 is maintained on the inner race 38 by the outer hub 42. When the load link assembly 16 is assembled, the outer race 44 is disposed about the inner race 38 and is confined in the lateral directions between the inner hub 34 and outer hub 42. The outer race 44 is free to rotate about the inner race 38 and is maintained thereon by the inner hub 34 and outer hub 42. Thus, each of the wheel supports 32, inner core 38, outer race 44 and outer hub 42, form a wheel assembly.

The outer race 44 has in inner bore 46. The inner bore 46 is slightly larger than the outside diameter of the inner race 38. It is desirable that the inner bore 46 be sized so as to permit rotation of the outer race 44 without undue play between the inner race 38 and outer race 44. Further, the inner bore 46 of the outer race 44 includes a grooved surface. In the most preferred embodiment, the grooved surface comprises a helical groove.

Figure 4:
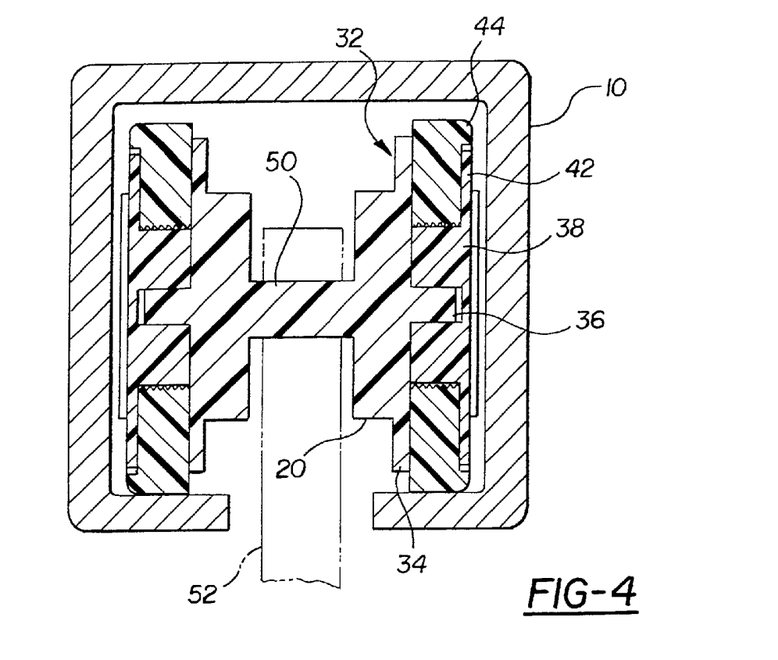
FIG. 4 is a cross sectional view of a load wheel assembly of the present invention.
Figure 5:
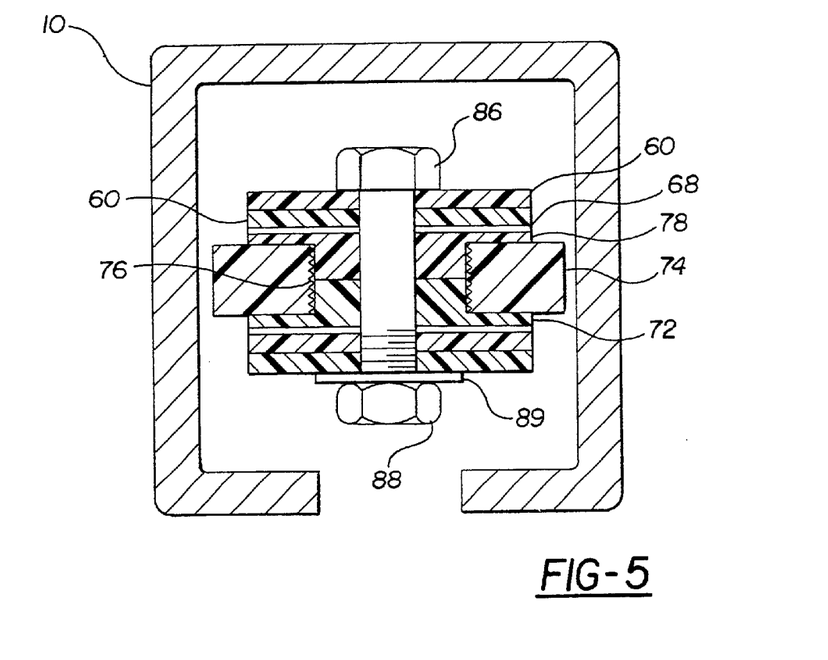
FIG. 5 is a cross sectional view of a guide wheel assembly of the present invention.

The groove resembles a thread system with a profile resembling a stub Acme thread system. The thread has a profile that is optimized to reduce friction between the inner race 38 and the inner bore 46 of the outer race. It is preferred that the crest of the bearing surface is flat. Similarly, it is preferred that the groove has a flat inner surface. It will be appreciated, however that the profiles of the crest and inner surface of the groove may take any configuration, such as pointed as shown in FIGS. 4 and 5 within the scope of the present invention. Similarly, the "threads" of the groove are shown pointed. These too may take any configuration within the scope of the present invention.

The groove is shown to be helical. It will be appreciated that the groove may also take other configurations. For example, the groove may comprise a series of annular grooves on the inner bore of the outer race 44. Also the groove may just comprise a series of indentations.

The primary purpose of the groove, whatever its configuration is to reduce the surface area of contact between the inner bearing surface of the outer race 44 and the outer surface of the inner race 38. This reduces friction on the bearing surfaces and helps prevent galling.

The depth of the groove, or height of the raised areas, should be sufficient to ensure a spacing between the respective crests. The spacing between the crests 26 may vary, but should allow for sufficient contact to support the outer race 16, yet allow for sufficient reduction in contact area between the respective bearing surfaces. To achieve this result, it is preferred that the effective contact area of the bearing surfaces not exceed one and one-half times the diameter of the bearing surface.

One example of such a helical groove is for the groove to resemble an Acme Thread System with a pitch between 0.500 inch and 0.2857 inch; profile thickness of width at flat crest of major bearing surface of between 0.0250 inch and 0.1667 inch; and the width of flat at root of major bearing surface of between 0.024 and 0.164 inch.

As set forth above, the preferred groove is helical. This allows the forces applied to the bearing surface to be uniformly dispersed. That is, there is no point contact between the crests of the groove and the outer surface of the inner race 38. Rather, as outer race 44 rotates relative to the inner race 38, the bearing surface constantly changes in location relative to the inner race 38.

The groove is shown on the inner bore 46 of the outer race 44. It will be appreciated that the groove may be located on the outer surface of the inner race 38. In this configuration, the inner bore 46 of the outer race 44 will be smooth. Thus, only one groove configuration need be located between the inner 38 and outer 42 races.

As best seen in FIGS. 2 and 3, the side walls 26 and 28 each have a recessed area for receiving the outer race 44 and outer hub 42. Specifically, the side walls 26, 28 include bumpers 48. The bumpers 48 extend outwardly from the side walls 26, 26 farther than the outermost portion of the outer race 44 and outer hub 42. The bumpers 48 help protect the outer race 44 from contacting the vertical surfaces of the track 10. As best seen in FIG. 2, the bumpers 48 are particularly helpful for protecting the outer races 44 when the chain assembly 12 negotiates a turn in the track 10. The bumpers 48 preferably extend outward of the side walls 26, 28 sufficiently so as to contact the vertical surface of the track 10, rather than the outer race 44 or outer hub 42 contacting the vertical surface of the track 10. This configuration will help reduce the possibility of damage to the outer race from side impact of the chain assembly 12.

The load link member 20 further includes a centrally located hangar post 50. The hangar post 50 is integrally formed with the load link member 20. The hangar post 50 extends between the inner surfaces of opposing side walls 26,28. The hangar post 50 is for receiving a hook 52 or like attachment. The hook 52 depends from the track 10 and can be used to secure items to be moved by the conveyor chain assembly 12.

In the preferred embodiment, the load link assembly 16 is preferably made of non-metallic components. These components are low-friction, self lubricating materials. At minimum, it is preferred that the bearing surfaces of the components, the inner bore of the outer race 44 and the outer surface of the inner race 38, be made of these materials.

The preferred composition for the components includes at least one matrix material that is either a thermoset or thermoplastic material. Matrix materials that have been found to be successful include phenolic, epoxy, polyurethane, polyetherketone, ultrahigh molecular weight polyethylene, polyimide, polyphthalamide, polyphenylene sulfide, polyesters, and fluoropolymers. The matrix selection is determined by the mechanical and thermal requirements of the use of the conveyor components. Combinations of matrix materials may also be used to achieve the desired properties.

The composition also includes an alloying additive or functional filler for increasing the strength, lubricity and wear resistance of the matrix material. The additive can be hard and soft particulate materials singularly or that are in combination from the graphites and refractory metals group and include materials such as molybdenum disulfide, Royal Sen pelletized master batch compositions commercially available from Sentinel Products Corporation of Hyannis, Mass. and the super-hard carbides, nitrides and oxides of titanium, boron, tungsten, tantaium, chromium or molybdenum. Such additives and fillers can also include glass fibers, boron nitride, polyarimide fibers (Kevlar®) or second-resin materials such as polyimide. It is preferred that the additive be abrasion or wear-resistant particulates also offering lubricating properties to reduce the friction.

The loading of the additive is also selected to optimize the physical properties desired in the final components. The loading varies depending on the selection of the matrix material, additive, and desired physical properties.

Each of the components can be made as composites by mandrel wrapping resin-rich cloth, reaction casting of high temperature fiber filled composition, compression molding, injection molding or lay-up.

Use of the composition and especially in combination with the grooved bearing design will provide components having a bearing assembly that can be used over a wide temperature range, will resist abrasion and will lessen friction. The components will not require lubrication.

The load link assembly 16 are made as follows. The load link member 20 and the inner hub 34 and support shaft 36 are all formed as one piece. Each of the outer races 44 are separately made. Further, each inner race 38 is integrally formed with the outer hub 42. In order to assemble the final load link assembly 32, the outer race 44 is placed about the inner race 38. The inner race 38/outer race 44 assembly is then inserted over the support shaft 36. The terminal end of the inner race 38 is secured to the inner hub 34 such as by cementing, solvent welding, use of adhesives or the like.

Similarly, the support shaft 36 is secured in the inner bore 46 such as by cementing, solvent welding, use of adhesives or the like. In this manner, the load link assembly 16 comprises an integral unit wherein each of the outer races 44 are free to rotate above the inner races 38. As best seen in FIG. 4, the outer races 44 are adapted to engage the horizontal surfaces of the enclosed track 10.

The guide link assembly 18 includes a pair of guide link members 54. Each guide link member 54 is generally U-shaped. The guide link members 54 include opposing arms 56. The arms 56 extend outwardly from a base 58. The arms 56 terminate in distal ends 60. The base 58 has a contact surface 62 adapted to receive the drive mechanism (not shown) for driving the conveyor chain assembly 12. Further, the base 58 defines an arcuate opening 64. The base 58 is adapted to engage the arcuate ends of the opening 30 of the load link member 20. In this manner, a pivotal connection as best seen in FIG. 2 is made between the guide link members 54 and load link members 20. The guide link members 54 and load link members 20 are thus capable of pivotal movement with respect to one another. More specifically, with a connection made in the manner described, that is, with the guide link member 54 disposed in the opening defined by the load link member 20, the guide link members 54 and load link members 20 are free to pivot in any direction, whether vertically, or horizontally, with respect to one another. This allows the chain assembly 12 to negotiate corners as well as inclines. Thus, it will be appreciated that, with this connection, the guide link members 54 and load link members 20 are freely pivotal in any plane with respect to one another.

The distal ends 60 of the arms 56 comprise a flat, circular disc-like configuration. The distal ends 60 include a hole 66 therethrough for receiving a fastener. The top and bottom surfaces are flat, except as set forth below.

One of the distal ends 60 on one of the arms 56 includes a rib 68. In the preferred embodiment, the rib 68 extends in a direction generally perpendicular to the longitudinal axis defined by the arms 56. Using a rib 68 that extends in a direction generally perpendicular to the longitudinal axis as defined by the arms 56 helps distribute the pulling force applied to the guide link assembly 18 more evenly over the guide link assembly 18. That is, if no rib were used, the pulling force applied to the guide link member 54 would be wholly transmitted to the fastener 58 and, in turn, through the fastener 58 to the next guide link member 54. The use of the rib 68 helps transmit some of the pulling force to the guide roller inner race half 72 and, through, the outer race 74 and fastener 80 to the other inner race half 72, and thereby to the associated link member 54. In this manner, any pulling load applied to one guide link member 54 is transmitted in a much more dispersed fashion to the associated guide link member 54.

The guide link assembly 18 includes a guide roller assembly generally indicated at 70. The guide roller assembly 70 includes a pair of guide roller inner race halves 72 and a guide roller outer race 74. In the preferred embodiment, the guide roller inner race halves 72 include an inner race bearing surface 76 and an outer flange 78. A central bore 80 extends through the guide roller inner race halves 72. The central bore 80 is for receiving the fastener 86. The flange 78 further includes a groove 82.

The outer race 74 includes an inner bore 84. The inner bore 84 defines an inner bearing surface for the outer race 74. The inner bore 84 preferably has a groove thereon. The groove on the inner bore 84 of the guide roller outer race 74 preferably has the same configuration as the groove described above with respect to the inner bore of the outer race 44 of the load link assembly 16 above. As above, the groove may alternatively be on the bearing surface of the inner race 72. In this configuration, the bore 84 has a smooth surface.

It is desirable that the inner bore 84 of the outer race 74 be sized so as to permit rotation of the outer race 74 without undue play between the inner race bearing surface 76 and the outer race 74.

The outer race 74 is sized such that its outer diameter is equal to or slightly larger than the greatest width of the load link member 20 defined by the opposing bumpers 48. By having a diameter that is larger than the width of the bumpers 48, the outer race 74 of the guide link assembly 18 helps keep the chain assembly 12 spaced from the vertical walls of the enclosed track 10.

Further, each of the components of the guide link assembly 18 is preferably non-metallic. The materials are the same and fabricated in the same manner as that disclosed with respect to the load link assembly 16 above. Again, it is preferred that at least each of the bearing surfaces is non-metallic.

In order to assemble a guide link assembly 18, two guide link members 54 are needed. The guide link members 54 are positioned in an opposite orientation with respect to one another. That is, one of the guide link members 54 has to be turned over with respect to the other identical guide link member 54. The guide link members 54 are nested with each other such that the ends 60 having the ribs 68 thereon face the interior of the guide link members 54. The other distal end 60 nests on the outside of the distal end 60 having the rib 68 thereon. This is best seen in FIG. 5. Because the outer surfaces of the distal end 60 is smooth, it freely pivots with respect to the distal end 60 of the adjacent guide link member 54. Thus, the nesting arrangement allows for pivotal movement of the guide link members 54 with respect to one another.

The outer race 74 is then placed about the inner race halves 72. More specifically, each inner race half 72 traps the outer race 74 therebetween. When assembled, the outer race inner bore 84 contacts the bearing surface 76 and is retained in position by the flanges 78.

Once the guide roller assembly 70 is assembled, it is placed between the distal ends 60 such that the grooves 82 engage respective of the ribs 68. Because one rib 68 is provided on both the upper and lower surface of the guide roller assembly 70, the ribs 68 will seat in the groove 82 of both the upper and lower inner race halves 72. After the guide link assembly 18 is aligned, a fastener 86 extends through the hole 66 in the distal end 60 of the guide link members 54 and through the central bore 80 in the inner race halves 72. Preferably, the fastener 86 is a bolt. Further, the bolt is preferably non-metallic, and is made of the same materials specified above. The bolt is secured on the bottom side with a nut 88. A washer 89 may also be inserted between the nut 88 and the distal end 60 of the guide link member 54. It is preferred the fastener assembly be tightened enough to secure the assembly together, without being tightened so far as to prevent relative pivoting movement of the distal ends 60. It will be appreciated, of course, that any suitable fastener may be used within the scope of the present invention.

With the connection made in this manner, the ribs 68 lock the respective inner race half 72 in position with respect to the associated guide link member 54. While the inner race half 72 can pivot with pivoting movement of the associated guide link member 54, the inner race halves 72 are not free to rotate between the guide link member 54 and outer race 74. Pivoting movement of one guide link member 54 will, in turn, cause relative pivoting movement of inner race half 72. Similarly, pivoting movement of the other guide link member 54 will cause associated pivoting movement of the other inner race half 72.

Thus, one embodiment of the present invention provides for a guide link assembly 18 that is pivotal intermediate its outermost ends. This is significant in that such an assembly allows for a tighter turning radius of the chain assembly 12 than is available with prior art devices. Further, such a design allows for ease of assembly, as set forth below.

It will be appreciated that the orientation of the nesting of the guide link members 54 may be reversed in adjacent of the guide link assemblies 18 as shown in FIG. 3.

In order to assemble a chain assembly 12 in accordance with the present invention, the following steps are followed. First, two load link assembly 16 must be made as set forth above. Next, the distal end 60 of one of the guide link members 54 is passed through the opening 30 in the load link member 20. Similarly, a second guide link member 54 has its distal end 60 inserted through the opening and a second load link member 20 of a load link assembly 16. Once the guide link members 54 are inserted through openings 30 and separate load link assemblies 16, they are nested together in the manner set forth above. Next, the guide roller assembly 70 is inserted between the nested distal ends 60 in the manner set forth above and a fastener 86 is placed through the assembly to secure the distal ends 60 of the guide link members with the guide roller assembly. This provides the pivotal connection between adjacent guide link members 54 and allows the guide link assembly 18 to be pivoted intermediate its terminal ends. This process is repeated until a desired length of chain assembly 12 has been reached. The chain assembly 12 is formed such that it is preferably in a closed loop for continuous movement through the track 10. That is, The last guide link assembly 18 is connected to the first load link 16 assembly to form a continuous loop. Typically this last connection has been made only after the chain assembly 12 has been inserted into the track 10.

It will be appreciated that the guide line members in certain applications may not be pivotable with respect to one another. In this embodiment, a non-pivoting connection may be made. This embodiment, while not providing a pivoting guide link, still offers the advantage of the pivotal connection between the adjacent load and guide links that does not require a pin connection therebetween.

Figure 6:
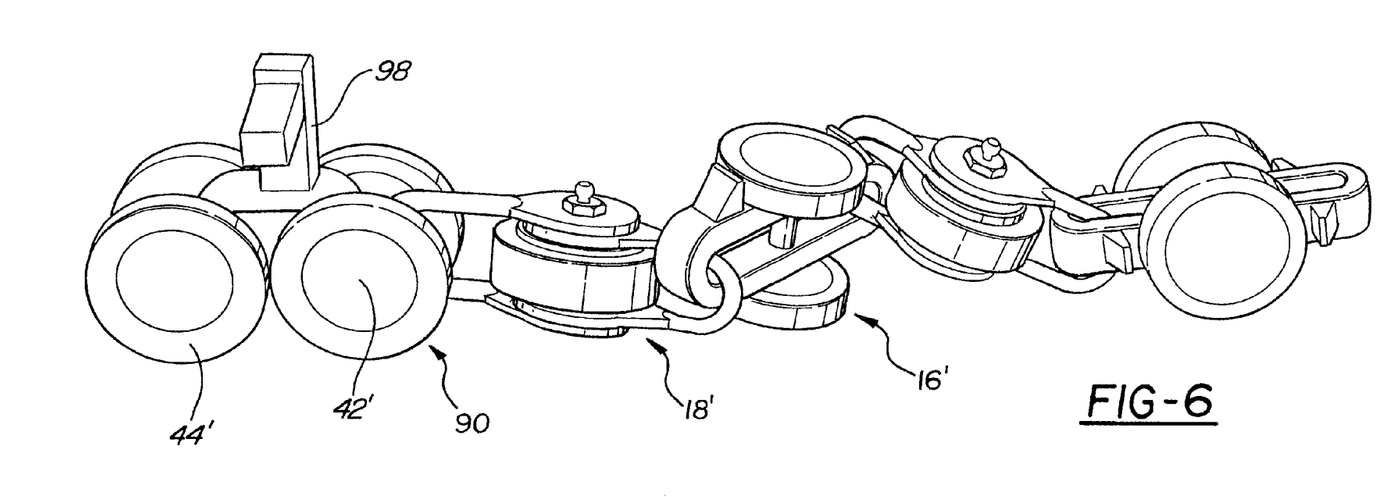
FIG. 6 is a side view of an alternate chain assembly made in accordance with the present invention.

FIGS. 6 through 9 show an additional embodiment of the chain of the present invention. Construction of these assemblies is as set for the above with the exceptions specifically noted below and in the figures. Like numerals will be used to describe the like components among the various parts. FIGS. 6 shows a chain assembly 12' having load link assemblies 16', guide link assemblies 18', and a pusher dog assembly 90. Pusher dog assemblies 90 are particularly useful in a power and free conveyor system, as are well known in the art.

Figure 7:
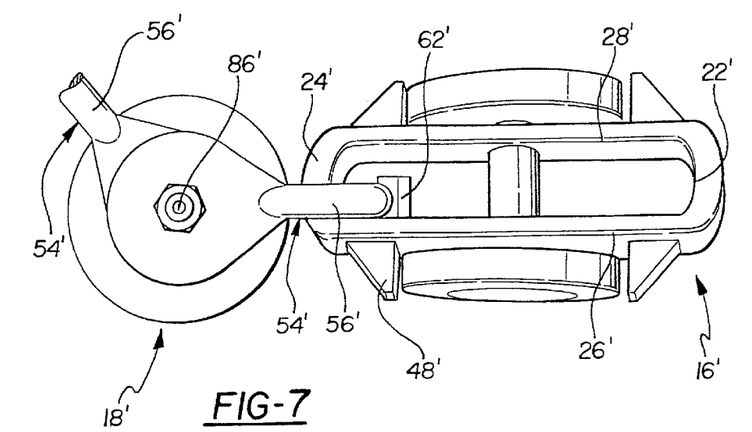
FIG. 7 is a top view of an alternate load link assembly and guide link assembly in accordance with the present invention.

As best shown in FIG. 7, the sidewalls 26',28' of the load link 16' assembly include bumpers 48' that project outwardly therefrom. Otherwise, the sidewall members 26', 28' are smooth and have arcuate forward 22' and rearward 24' ends.

Also shown in FIG. 7 is the pivoting motion of the guide link members 54' with respect to one another about the axis defined by the fastener 86'. Also as shown in FIG. 7, the arms 56' of the guide link member 54' are circular in cross-section. A contact surface 62' is built up on the ends of the base. This contact surface 62' is also seen in FIG. 9.

Figure 8:
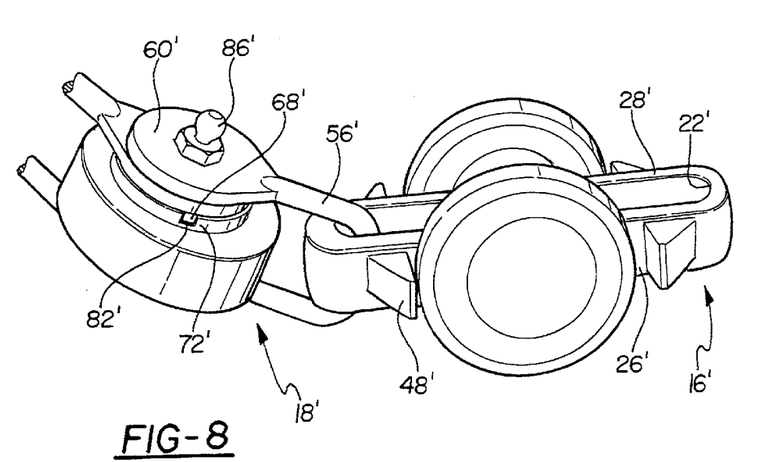
FIG. 8 is a side view of an alternate link and side link assembly made in accordance with the present invention.

FIG. 8 shows a load link assembly and guide link assembly. FIG. 8 shows the nesting of the distal ends 60' of the guide link 18'. The rib 68' in the distal end 60', as well as the groove 82' in the inner race half 72' can be seen.

The pusher dog assembly 90 includes a body 92 having two openings 94, 96 therein as best seen in FIG. 9. The pusher dog assembly 90 includes a dog 98 extending upwardly from the body 92. Further, the body 92 has four inner hub and support shafts as described above with respect to the load link assembly. The pusher dog assembly 90 also includes four inner races and outer hubs 42', and four outer races 44' as described with respect to the load link 16 assembly above.

Finally, as best seen in FIG. 9, the pusher dog 90 has a base defining two generally rectangular openings 94, 96 having arcuate ends. The openings 94, 96 receive the base 58' of the guide link members 18'.

Figure 10:
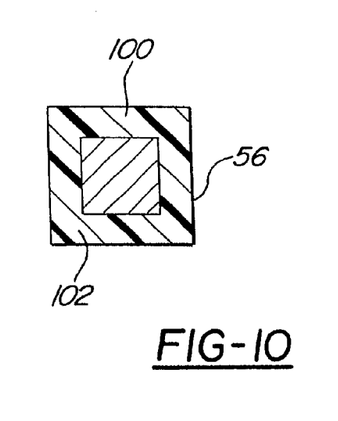
FIG. 10 is a cross-sectional view showing another embodiment of the claim of the present invention.

While in the preferred mode, the invention is disclosed as being made of non-metallic components, it will be appreciated that the components of the assembly 12 can be made of metal and can use conventional inner and outer races and roller bearings therebetween. A system using conventional bearings can be configured to include the novel pivotal action of the guide link assembly as set forth above, as well as the novel connection between the load link assembly and guide link assembly. Even further, any or all of these components of the assembly 12 may be both metallic and non-metallic. Specifically, an inner metallic core may be made. The metallic core can then be overmolded with the non-metallic material. A cross-section of one such component is shown in FIG. 10. FIG. 10 shows a cross-section of the arm 56, at one location, of the guide link member 54. As shown, the guide link member 56 has a non-metallic exterior 100 and a metallic core 102. Accordingly, the particular materials selected to make the pivotal guide link assembly 18 of the chain assembly 12 is not critical, it may be metal, non-metallic, preferably as described above, or a combination of both. Similarly, the material selected to make any of the other components of the chain assembly can be metal, non-metallic or a combination of both.

It will be appreciated that the chain assembly 10 described herein can be used in conventional enclosed track systems, as well as with inverted systems, power and free systems and inverted power and free systems.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A conveyor chain assembly particularly adapted for use in an enclosed track, said assembly comprising;
   a load link assembly comprising a load link defining an opening and having at least one race assembly;
   a guide link assembly including at least two guide link members connected intermediate opposing ends of said guide link assembly, one of said guide link members disposed in said opening to thereby connect said guide link with said load link.

2. An assembly as set forth in claim 1 wherein said guide link member includes opposing arms extending outwardly from a base.

3. An assembly as set forth in claim 2 wherein said load link assembly includes a load link including a pair of side walls and forward and rearward ends defining said opening therebetween.

4. An assembly as set forth in claim 3 wherein said guide link member is connected to said load link such that said opposing arms are disposed on opposite sides of said load link wherein said base of said guide link member is adjacent one of said forward and rearward ends of said load link.

5. An assembly as set forth in claim 4 wherein said guide link assembly comprises two guide link members pivotally connected.

6. An assembly as set forth in claim 5 wherein each said opposing arms of said guide link member terminates at a distal end, said distal ends having a flat portion, and at least one of said flat portions of one of said distal ends having a rib thereon.

7. An assembly as set forth in claim 6 wherein said rib extends generally perpendicular to a longitudinal axis defined by said arms.

8. An assembly as set forth in claim 7 wherein said guide link assembly further includes a guide roller assembly rotatably secured to said distal ends of said arms.

9. An assembly as set forth in claim 8 wherein said guide roller assembly includes a pair of guide roller inner race halves and a guide roller outer race rotatably supported on said guide roller inner race halves.

10. An assembly as set forth in claim 9 wherein said inner race halves each comprise an inner race bearing surface and an outer flange, said outer flange further including a groove thereon for engaging said rib of said distal end of said guide link.

11. An assembly as set forth in claim 10 wherein each of said flat portions of said distal ends and said inner race includes a bore therethrough for receiving a fastener, said fastener pivotally securing said guide link members.

12. An assembly as set forth in claim 10 wherein said outer race includes an inner bearing surface, one of said inner bearing surface of said outer race and said inner race bearing surface defining a groove thereon.

13. An assembly as set forth in claim 12 wherein said groove is helical.

14. An assembly as set forth in claim 4 wherein said load link assembly further includes a pair of outer races rotatably secured to said load link assembly.

15. An assembly as set forth in claim 14 wherein the load link assembly further includes a pair of wheel supports integral with said side walls, an inner race adapted to be supported on said wheel support, and an outer hub connected to said inner race, said outer race rotatably disposed about said inner race, between said inner hub and said outer hub.

16. An assembly as set forth in claim 14 wherein said load link members include at least one bumper extending outwardly therefrom.

17. As assembly as set forth in claim 16 wherein said bumpers extend outwardly a distance greater than the wheel assembly.

18. An assembly as set forth in claim 17 wherein said load link assembly further includes a hanging bracket disposed between said side walls.

19. An assembly as set forth in claim 18 wherein said conveyor chain assembly includes a pusher dog, said pusher dog including the base defining a pair of openings for receiving said guide link members, and a pusher member extending upwardly from said base.

20. An assembly as set forth in claim 19 wherein said pusher dog includes four wheel assemblies.

21. A method of assembling a conveyor chain particularly adapted for use in an enclosed track, said method comprising:
- obtaining at least a pair of load link members, each having an opening therein;
- obtaining at least a pair of guide link members, each including a pair of opposing arms extending from a base;
- extending one of said opposing arms through said opening of said load link member and inserting the arm until the base of the guide link member engages the load link member;
- inserting a guide link member through the next adjacent load link member until the base of the guide link member engages the load link member;
- securing the distal ends of the guide link members to form a guide link assembly connected intermediate opposing ends thereof.

22. A method as set forth in claim 21 further characterized by pivotally connecting said guide link members.

23. A method as set forth in claim 21 wherein adjacent guide link and load link members are secured in the manner set forth above until a desired length chain is reached, thereafter securing the last guide link member through the opening in the first load link member to form a loop conveyor.

* * * * *